United States Patent [19]

Schnitzius

[11] 4,230,309
[45] Oct. 28, 1980

[54] GAS SPRING WITH AUTOMATIC LOCKING MECHANISM

[75] Inventor: Klaus Schnitzius, Rheinbrohl, Fed. Rep. of Germany

[73] Assignee: Stabilus GmbH, Koblenz-Neuendorf, Fed. Rep. of Germany

[21] Appl. No.: 858,154

[22] Filed: Dec. 7, 1977

[30] Foreign Application Priority Data

Dec. 30, 1976 [DE] Fed. Rep. of Germany ....... 2659488

[51] Int. Cl.$^2$ ............................ F16F 9/02; F16F 9/06
[52] U.S. Cl. ....................................... 267/120; 16/66;
160/189; 160/192; 188/282; 188/284; 188/288;
188/300; 267/64 R; 267/65 R; 267/124; 296/56
[58] Field of Search ................. 267/64 R, 64 A, 64 B,
267/65 R, 120, 124; 188/284, 288, 282, 317,
300, 322; 296/56, 57 R; 160/189, 192; 16/51,
52, 66

[56] References Cited

U.S. PATENT DOCUMENTS

| | | | |
|---|---|---|---|
| 2,920,338 | 1/1960 | Falk | 16/66 |
| 3,147,966 | 9/1964 | Axthammer et al. | 267/64 R |
| 3,307,597 | 3/1967 | Shugarman | 137/493 X |
| 3,447,644 | 6/1969 | Duckett | 188/288 |
| 3,598,205 | 8/1971 | Kenyon | 188/284 |
| 3,722,920 | 3/1973 | Reese | 188/288 X |
| 3,865,356 | 2/1975 | Wossner | 267/139 |
| 3,963,227 | 6/1976 | Molders | 296/56 X |

Primary Examiner—George E. A. Halvosa
Attorney, Agent, or Firm—Brumbaugh, Graves, Donohue and Raymond

[57] ABSTRACT

A gas spring includes a cylinder having two axial portions of different cross section and two pistons mounted on a common piston rod and respectively matching the cross sections of the cylinder portions. The pistons are spaced on the piston rod so that they are either both in the wider cylinder portion or respectively received in the two portions. A first throttling passage permits flow of fluid between the two cylinder compartments separated by the larger piston, and a second throttling passage by-passes the smaller piston only during movement inward of the smaller cylinder portion to permit flow of fluid out of that cylinder portion. A valve arrangement is biased for sealing the two parts of the cylinder cavity separated by the smaller piston when the latter is in the smaller cylinder portion, but does not move inward of that portion. The valve arrangement responds to a sufficient, axially applied force for connecting the two cavity parts.

8 Claims, 4 Drawing Figures

GAS SPRING WITH AUTOMATIC LOCKING MECHANISM

This invention relates to pneumatic and hydropneumatic springs, commonly referred to as gas springs, and particularly to a gas spring with automatic locking mechanism and to arrangements, such as pivotally mounted parts on the body of an automotive vehicle combined with a gas spring of the invention.

Gas springs have found a rapidly expanding field of application in automotive vehicles in which they compensate for the weight of motor hoods, trunk lids, and particularly rear windows in station wagons and passenger cars which swing about a horizontal axis. The pivotally mounted masses need to be held in the open position against the force of gravity, and it was proposed in the commonly owned U.S. Pat. No. 3,938,793 to build a mechanical stop into the gas spring. The stop is released by further lifting the hood, lid, or window, and this is inconvenient to some people, particularly those not familiar with this specific type of gas spring.

It has now been found that certain features known from the two-stage shock absorber disclosed in U.S. Pat. No. 3,447,644 may be modified for use in a gas spring to provide an automatic locking mechanism which can be released by gentle manual pressure applied to the pivotally mounted mass in a downward direction.

According to one more specific aspect of this invention, there is provided a gas spring whose cylinder has an axis and bounds a sealed, fluid filled cavity therein. A first portion of the cavity has a greater cross section at right angles to the axis than a second cavity portion axially offset from the first portion in a predetermined direction. A piston rod axially movable into and out of the cavity in sealing engagement with the cylinder carries a first piston and a second piston in axially spaced relationship. The pistons have respective cross sections matching those of the two cavity portions. They move with the piston rod between a first position in which both pistons are received in the greater, first cavity portion and a second position in which they are received respectively in the matching cylinder portions. A first throttling passage axially by-passing the larger first piston permits flow of fluid between the two compartments of the cylinder cavity which are separated by the first piston. A second throttling passage permits flow of fluid between the two parts of the cylinder cavity separated by the second, smaller piston in the second position of the latter only when the second piston moves relative to the cylinder in the afore-mentioned predetermined direction. A valve arrangement normally seals the two cavity parts from each other in the absence of such piston movement in the predetermined direction, but responds to a sufficient force axially applied to the piston rod for connecting the cavity parts.

In another aspect, the invention also provides a gas spring arrangement in which one or more gas springs of the type described above, whose cavities are charged with a fluid under superatmospheric pressure, are interposed between a support and a solid mass mounted on the support for movement in a direction having a vertical component, and therefore biased by gravity from a raised toward a low position. The cylinder and piston rod of the spring or of each spring is secured to the support and the mass in such a manner that the combined axial length of cylinder and piston rod increases during movement of the mass from the low to the raised position, and the second piston simultaneously moves into the smaller, second portion of the cylinder. The fluid includes a gas in the cylinder cavity under such pressure that the vertical component of the force of the gas biasing the piston rod outward of the cylinder cavity is greater than one half of the force of gravity biasing the mass toward its low position, but smaller than the force of gravity. In a typical application of such a gas spring arrangement, the support is the body of an automotive vehicle, and the mass is an element pivotally fastened to the body for movement between low and raised positions.

Other features and many of the attendant advantages of this invention will readily be appreciated as the same becomes better understood by reference to the following detailed description of preferred embodiments when considered in connection with the appended drawing in which.

Figure 1:
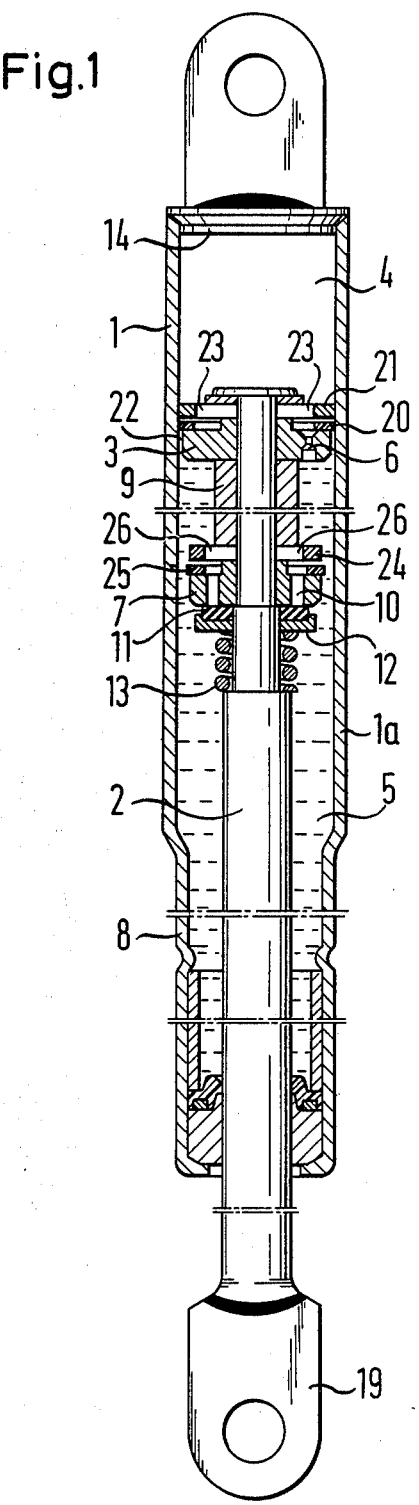
FIG. 1 shows a gas spring of the invention in elevational section.

Referring now to the drawing in detail, and initially to FIG. 1, there is seen a gas spring whose normally visible elements are a cylinder 1 and a piston rod 2 sealed in an annular end wall of the cylinder 1 in axially slidable engagement. The end of the piston rod 2 in the sealed cavity of the cylinder 1 carries a main piston 3 which axially separates two compartments 4,5 of the cavity. A restricted, axial bore 6 in the piston 3 permanently connects the compartments. The cross section of the piston 3 matches that of the main portion of the cylinder 1.

A second piston 7 matches in cross section the radially reduced portion of the cavity in a part 8 of the cylinder near the annular end wall. The two pistons 3,7 are mounted on the piston rod 2 in fixed axial positions maintained by a tubular spacer 9 in such a manner that the pistons move with the piston rod between the illustrated position, in which both pistons are received in the main portion of the cylinder cavity, and a non-illustrated position in which the piston 3 is still in the main portion of the cavity while the smaller piston 7 is received in the reduced cylinder portion 8.

The orifices of large, axial bores 10 of the piston 7 in the radial bottom face of the piston are sealed by a pressure relief valve including an annular, flat valve disc 11 of elastomeric material backed by a metal disc 12 and a helical compression spring 13 whose ends abut against the disc 12 and a shoulder of the piston rod 2.

The free end of the piston rod 2 outside the cylinder cavity and the imperforate end wall of the cylinder 1 which axially bounds the cylinder cavity carry fastening eyes 19, as is conventional.

The two pistons 3, 7 are equipped with check valves, or one-way valves constituted by respective piston rings 20, 25 capable of axial movement relative to the piston rod 2 and the main parts of the respective pistons 3, 7. Such movement is limited by retaining rings 21, 24 attached to the piston rod 2 by angularly spaced radial arms 23, 26.

During movement of the piston rod 2 inward of the cylinder 1, the piston ring 20 which frictionally engages the inner cylinder face abuts against the top face of the piston 3 and seals the narrow, annular clearance gap 22 between the main piston 3 and the cylinder 1. During outward movement of the piston rod 2, that is, during movement in the same direction in which the piston 7 is offset from the piston 3, frictional drag holds the piston ring 20 against the retaining ring 21, thereby opening an additional, wider flow path between the two compartments 4,5 through the gaps between the arms 23 and the gap 22 supplementing the flow path through the throttling bore 6.

As long as the second piston 7 is received in the wide, main portion of the cylinder cavity, the associated devices described above are inoperative. Fluid may flow freely between the cylinder wall and the piston 7. When the piston 7 enters the cylinder portion 8, the piston ring 25 operates as described above with reference to the ring 20. It opens a slightly restricted path for flow of liquid between the two cavity parts otherwise separated by the piston 7 in the cylinder part 8 during downward movement of the piston rod 2, but it seals this path when the piston assembly of piston rod 2, pistons 3 and 7, and associated elements moves inward of the cylinder cavity, that is upward, as viewed in FIG. 1.

Except for a small body of highly compressed air or nitrogen, the cylinder cavity is filled with liquid, such as hydraulic brake fluid or oil. When the by-pass through the ring 25 is closed and no liquid can flow between the cavity parts on opposite sides of the piston 7 in the cylinder part 8, the piston assembly is locked in position as long as the spring 12 holds the valve disc 11 against the orifices of the bores 10. The strength of the spring and the gas pressure in the cylinder cavity are matched to the normal operating forces tending to push the piston rod 2 inward of the cylinder 1 so that the valve disc 11 maintains its sealing position. However, an inward force applied to the piston rod 2 which is greater than the normal operating force for which the spring is designed can overcome the spring pressure and open the bores 10 to flow of liquid through the piston 7. The piston 7 thereafter can be moved out of the cylinder portion 8 against the pressure of the gas cushion which tends to push the piston rod 2 out of the cylinder 1.

The gas spring 34 illustrated in FIG. 2 differs from that described with reference to FIG. 1 by a gas-filled cylinder 1' which has a radially expanded terminal portion 15 adjacent to the imperforate end wall 14, and by a piston rod 2' modified to accommodate an axial bore 16 communicating with a radial bore 17. The passage formed by the bores 16, 17 by-passes the unchanged piston 3 as well as the piston 7' which lacks the axial bores 10 of the otherwise identical piston 7. A valve sleeve 18 of oil-resisting rubber normally seals the orifice of the radial bore 17 subjacent the piston 7'. It is to be understood that the expanded terminal portion 15, while shown only in FIG. 2, may in fact be associated with the gas spring of each figure.

Figure 2:
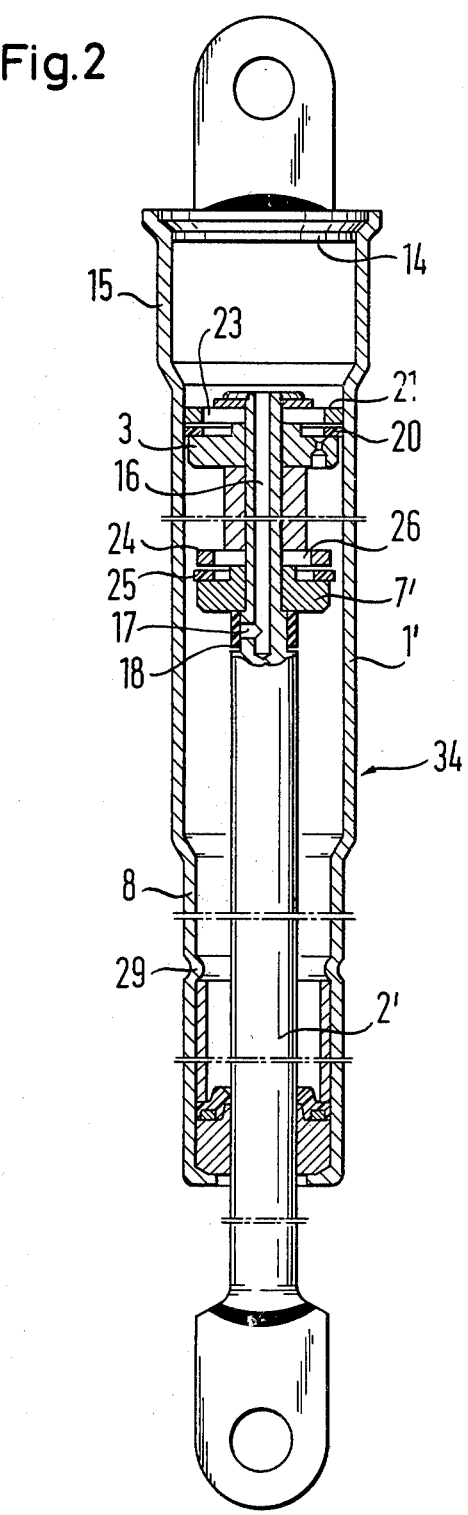
FIG. 2 illustrates a modification of the spring of FIG. 1 in a corresponding view.

When moving outward of the cylinder cavity from the illustrated position, the piston assembly shown in FIG. 2 operates as described above with reference to FIG. 1. The piston rings 20, 25 permit fluid flow past the pistons 3, 7'. When outward movement stops, and an applied external load causes incipient inward movement of the piston rod 2, the piston ring 25 seals all available by-pass connections between the parts of the cylinder cavity on opposite axial sides of the piston 7', and the axial length of the spring, that is, the combined length of the cylinder 1' and the piston rod 2' cannot be changed until a greater external force causes the rubber sleeve 18 to be lifted from the orifice of the bore 17 by the pressure of the gas entering the bore 16.

When the piston assembly moves inward of the cylinder 1 from the illustrated position, gas flow initially is restricted to the throttling passage through the piston 3 because the clearance space between the piston 3 and the cylinder wall is sealed by the piston ring 20. When the piston ring clears the main portion of the cylinder 1' and enters the expanded cylinder portion 15, so wide an annular passage is opened between the piston and the cylinder as not to present significant resistance to further movement of the piston assembly to the upper end of its stroke. The downward stroke is limited by an internal rib 29 in all illustrated embodiment of the invention short of abutting engagement of the piston 7' with the annular end wall of the cylinder.

Figure 3:
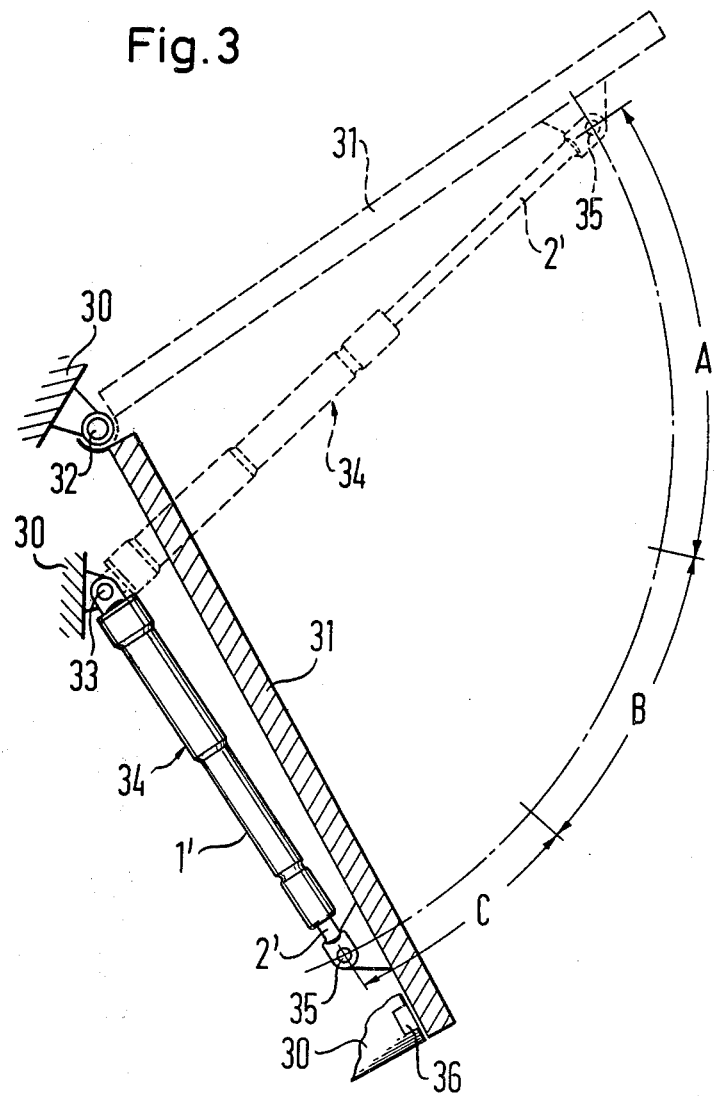
FIG. 3 illustrates an automotive vehicle including gas springs of the type shown in FIG. 2 in a fragmentary, side-elevational view.

FIG. 3 shows as much of the otherwise conventional body 30 of a motorcar as is needed for illustrating a typical application of the gas springs of the invention, in this instance the spring 34 illustrated in FIG. 2. A trunk lid 31 is attached to the vehicle body 30 by pivots 32 whose common axis is horizontal and transverse to the normal direction of vehicle movement. The cylinders of two gas springs 34, of which one obscures the other in the view of FIG. 3, are hinged to the body 30 below the pivots 32 on coaxial pins 33, each gas spring being approximately in line with a side wall of the car body. The fastening eyes on the piston rods 2' are attached to the lid 31 by hinge brackets 35 near the lower lid edge. In the closed lid position shown in fully drawn lines, the piston assembly in the spring 34 assumes a position similar to that seen in FIG. 2 in which the compressed gas in the spring cylinder near the hinge pin 33 tends to expel the piston rod 2'.

When a lock 36 is opened, the lid may be lifted manually into the raised position indicated in broken lines. The bracket 35 travels in a path indicated in chain dotted line which, in the fully drawn low position, is almost perpendicular to the spring axis so that the gas pressure in the spring 34 initially contributes little to overcoming the force of gravity acting on the window. Because of the illustrated relative positions of the respective pivot axes of the lid and of the gas spring on the vehicle body 30, the angle between the axis of the spring and the path of the bracket 35 increases as the lid 31 is raised, and the force exerted by the gas pressure on the piston rod 2 increasingly counteracts the force of gravity acting on the lid 31.

The gas pressure is preferably chosen sufficient for almost balancing the force of gravity over at least a portion of the upward lid movement while the piston assembly moves outward of the cylinder 1 in a direction which is downward in the view of FIG. 2, but is gradually inverted as is evident from FIG. 3. Lightly applied manual force causes the lid to be raised.

During the outward movement of the piston rod 2' from the cylinder 1' and the simultaneous movement of the lid 31 from the low to the raised position, the one-way valves constituted by the piston rings 20, 25 and associated elements are open and present minimal resistance to the necessary fluid flow as long as both pistons 3, 7' are in the wide main section of the cylinder cavity. The upward movement in braked only slightly by the restricted flow path through the annular clearance between the second piston 7' and the narrower cylinder portion 8. When the piston 7' ultimately is stopped by abutment against the rib 29, or by cooperating abutments on the body 30 and the lid 31, or is released from manual lifting force before the end of its available stroke is reached, the lid starts descending, and the piston ring 25 is shifted almost instantaneously into the position on the piston 7' which is illustrated in FIG. 2 and prevents the flow of liquid necessary for inward movement of the piston rod 2'. The lid is locked in its raised position.

Gravity alone cannot open the bore 17. However, light manual downward pressure applied to the lid and assisted by the weight of the latter overcomes the combined resistance of gas pressure and of the resiliency of the sleeve 18 to expand the latter and to permit fluid flow through the bore 16 inward of the cylinder portion 8 while the lid 31 swings downward through the arc A (FIG. 3). Even less manual pressure is required as soon as both pistons are received in the wider main portion of cylinder 1'. When the main piston 3 moves into the enlarged cylinder portion 15 at the end of the arc B (FIG. 3), viscosity of the gas no longer contributes a significant braking effect. The gas pressure being insufficient for balancing the weight of the lid 31, the latter moves through the arc C at increasing velocity until the lock 36 is engaged.

When the gas springs of the type illustrated in FIG. 1 are substituted in the spring arrangement illustrated in FIG. 3 for the springs 34, the mode of operation is modified only to the extent that slight manual pressure needs to be applied until the lock 36 engages the lid 31 in the low position. Similar operation is necessary with the additional gas spring illustrated in FIG. 4.

It differs in external appearance from the structure illustrated in FIG. 1 by a cylinder 1" which is cylindrical over its entire length except for an annular groove corresponding to the rib 29. The piston assembly shown in FIG. 4 includes a second piston 7' free from axial bores in the same manner as in FIG. 2. The reduced portion of the cylinder cavity matching the cross-section of the piston 7' is formed by a generally cylindrical sleeve 140 axially fixed in the cylinder 1" by a shrink fit and provided with axial, external grooves 141 sealed in a radially outward direction by the inner face of the cylinder 1". The grooves 141 are normally sealed toward the rib 29 and the annular end wall of the cylinder 1" by a plastic valve plate 142 and a helical compression spring 143 interposed between the valve plate and a washer 144 on the rib 29.

Figure 4:
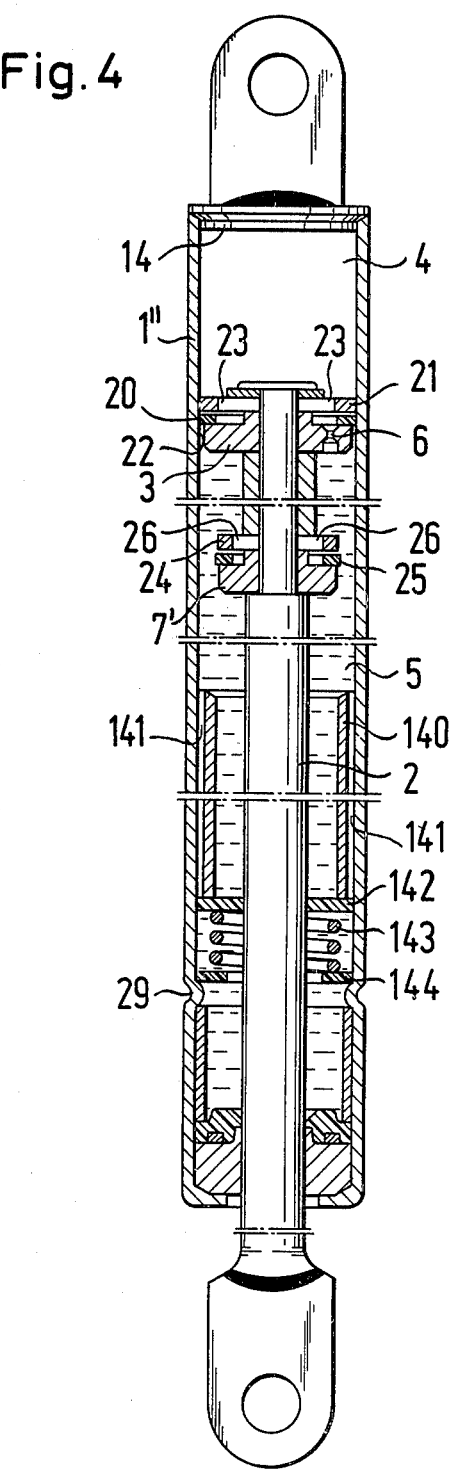
FIG. 4 is a sectional, elevational view of yet another gas spring of this invention.

During outward movement of the piston assembly of FIG. 4 from the cylinder cavity which is assisted by the compressed gas in the cylinder, the one-way valves at the piston rings 20, 25 are open. When the piston ring 25 is shifted into the illustrated position by the frictional drag of the sleeve 140, i.e., when the second piston 7' is within the sleeve 140 and the piston rod 2 is urged upwardly, the piston assembly is axially locked until sufficient inward pressure is applied to the piston rod 2 to open the valve plate 142 against the biasing restraint of the spring 143. As will be appreciated, when the piston assembly moves upward the pressure above the second piston 7' is increased, and this pressure acts downward through the grooves 141 to lift the edge of the valve plate off the lower end of the sleeve 140.

While the gas springs of the invention have their greatest utility at this time in automotive applications of the kind illustrated in FIG. 3, they may be employed to advantage wherever a solid mass is mounted on a support for movement in a direction having a vertical component, and those skilled in the art will know how to select internal gas pressures and suitable resilient valve elements to achieve a desired mode of operation in which the piston assembly is locked automatically when its movement is stopped or reversed, but can be released by pressure applied in the direction of the reversed movement.

It should be understood, therefore, that the foregoing disclosure relates only to preferred embodiments of the invention, and that it is intended to cover all changes and modifications of the examples of the invention chosen herein for the purpose of the disclosure which do not constitute departures from the spirit and scope of the invention set forth in the appended claims.

What is claimed is:

1. A gas spring, comprising:
   (a) a cylinder member having an axis of elongation, a closed, axially inner end wall and an annular, axially outer end wall and defining therein a sealed cavity, said cylinder including means defining a first transverse cross section over an axially inner portion of said cavity and means defining a second, smaller transverse cross section over an axially outer portion of said cavity;
   (b) a piston rod member received through said annular outer end wall in sealing engagement therewith for axial movement within said cavity;
   (c) first and second axially spaced piston means carried by said piston rod within said cavity, with said first piston means being located axially inwardly of said second piston means, for movement between an axially inner position at which at least said second piston means is located within said axially inner cavity portion and an axially outer position at which said first piston means is located within said axially inner cavity portion and said second piston means is located within said axially outer cavity portion, said piston rod member and said first and second piston means jointly constituting a piston assembly;
   (d) said first and second piston means having transverse cross sections which match the transverse cross sections of said axially inner and axially outer cavity portions, respectively, for slidable sealing engagement therewith;
   (e) a fluid within said cavity;
   (f) means for permitting fluid flow from one side of said first piston means to the other when said first piston means moves axially in said cavity;
   (g) first flow control means for controlling fluid flow from one side of said second piston means to the other when said second piston means is located within said axially outer cavity portion, said first flow control means being responsive, when said second piston means is in said axially outer cavity portion, to (1) axially inward movement of said second piston means for restricting fluid flow from the axially inner side to the axially outer side of said second piston means and to (2) axially outward movement of said second piston means for permitting fluid flow from the axially outer side to the axially inner side of said second piston means; and
   (h) second flow control means for controlling fluid flow from the axially inner side to the axially outer side of said second piston means when said second piston means is located in said axially outer cavity portion, said second flow control means including (1) a bore in said piston assembly by-passing said first and second piston means and connecting that part of the cavity inward of said piston assembly to that part of the cavity outward of said piston assembly and (2) valve means normally biased to a closed position, at which fluid flow through said bore is prevented, said valve means being responsive, when said second piston means is in said axially outer cavity portion, to the application of sufficient axially inward force to the piston rod member to overcome the biasing force of said valve means to move said valve means to an open position, at which fluid flow through said bore from the axially inner side to the axially outer side of said second piston means is permitted;

(i) whereby when moved to said axially outer position said piston rod member will remain in said axially outer position until an external force sufficient to overcome the biasing force of said valve means is applied to the piston rod member to move it inwardly of said axially outer position.

2. A gas spring as set forth in claim 1, wherein said bore has an orifice in said piston assembly opening into one of said cavity parts, and said valve means includes a valve member in said one cavity part and resilient means biasing said valve member into sealing engagement with said orifice.

3. A gas spring as set forth in claim 2, wherein said bore is formed as an axial bore in said piston rod and said orifice is formed as a radial orifice in said piston rod.

4. A gas spring as set forth in claim 1, wherein said first flow control means includes (1) a passage axially by-passing said second piston means and (2) a member responsive to movement of said piston assembly in said outward and inward directions for respectively opening and closing said passage.

5. A gas spring, comprising:
(a) a cylinder member having an axis of elongation, a closed, axially inner end wall and an annular, axially outer end wall and defining therein a sealed cavity, said cylinder including means defining a first transverse cross section over an axially inner portion of said cavity and means defining a second, smaller transverse cross section over an axially outer portion of said cavity;
(b) a piston rod member received through said annular outer end wall in sealing engagement therewith for axial movement within said cavity;
(c) first and second axially spaced piston means carried by said piston rod within said cavity, with said first piston means being located axially inwardly of said second piston means, for movement between an axially inner position at which at least said second piston means is located within said axially inner cavity portion and an axially outer position at which said first piston means is located within said axially inner cavity portion and said second piston means is located within said axially outer cavity portion;
(d) said first and second piston means having transverse cross sections which match the transverse cross sections of said axially inner and axially outer cavity portions, respectively, for slidable sealing engagement therewith, said means defining said second transverse cross section over said axially outer cavity portion including an annular member located within said cylinder member, said annular member defining internally thereof said second transverse cross section and having an axial length sufficient to extend axially beyond said second piston means in both axial directions when said second piston means is at said axially outer position;
(e) a fluid within said cavity;
(f) means for permitting fluid flow from one side of said first piston means to the other when said first piston means moves axially in said cavity;
(g) first flow control means for controlling fluid flow from one side of said second piston means to the other when said second piston means is located within said axially outer cavity portion, said first flow control means being responsive, when said second piston means is in said axially outer cavity portion, to (1) axially inward movement of said second piston means for restricting fluid flow from the axially inner side to the axially outer side of said second piston means and to (2) axially outward movement of said second piston means for permitting fluid flow from the axially outer side to the axially inner side of said second piston means; and
(h) second flow control means for controlling fluid flow from the axially inner side to the axially outer side of said second piston means when said second piston means is located in said axially outer cavity portion, said second flow control means including (1) one or more passages in the external wall of said annular member by-passing said second piston means and connecting that part of the cavity inward of said annular member to that part of the cavity outward of said annular member and (2) valve means normally biased to a closed position, at which fluid flow through said one or more passages is prevented, said valve means being responsive, when said second piston means is in said axially outer cavity portion, to the application of sufficient axially inward force to the piston rod member to overcome the biasing force of said valve means to move said valve means to an open position, at which fluid flow through said one or more passages from the axially inner side to the axially outer side of said second piston means is permitted;

(i) whereby when moved to said axially outer position said piston rod member will remain in said axially outer position until an external force sufficient to overcome the biasing force of said valve means is applied to the piston rod member to move it inwardly of said axially outer position.

6. A gas spring as set forth in claim 5, wherein both of said first and second piston means are located within said axially inner cavity portion at said axially inner position.

7. A gas spring as set forth in claim 5, wherein said axially inner and axially outer positions are the respective terminal positions of movement of said piston rod member relative to said cylinder member.

8. A gas spring as set forth in claim 5, further comprising means operative upon movement of said first piston means inwardly of said axially inner position for permitting increased fluid flow from the axially inner side to the axially outer side of the first piston means, so as to offer decreased resistance to further inward movement of said piston rod member.

* * * * *